Patented Sept. 12, 1933

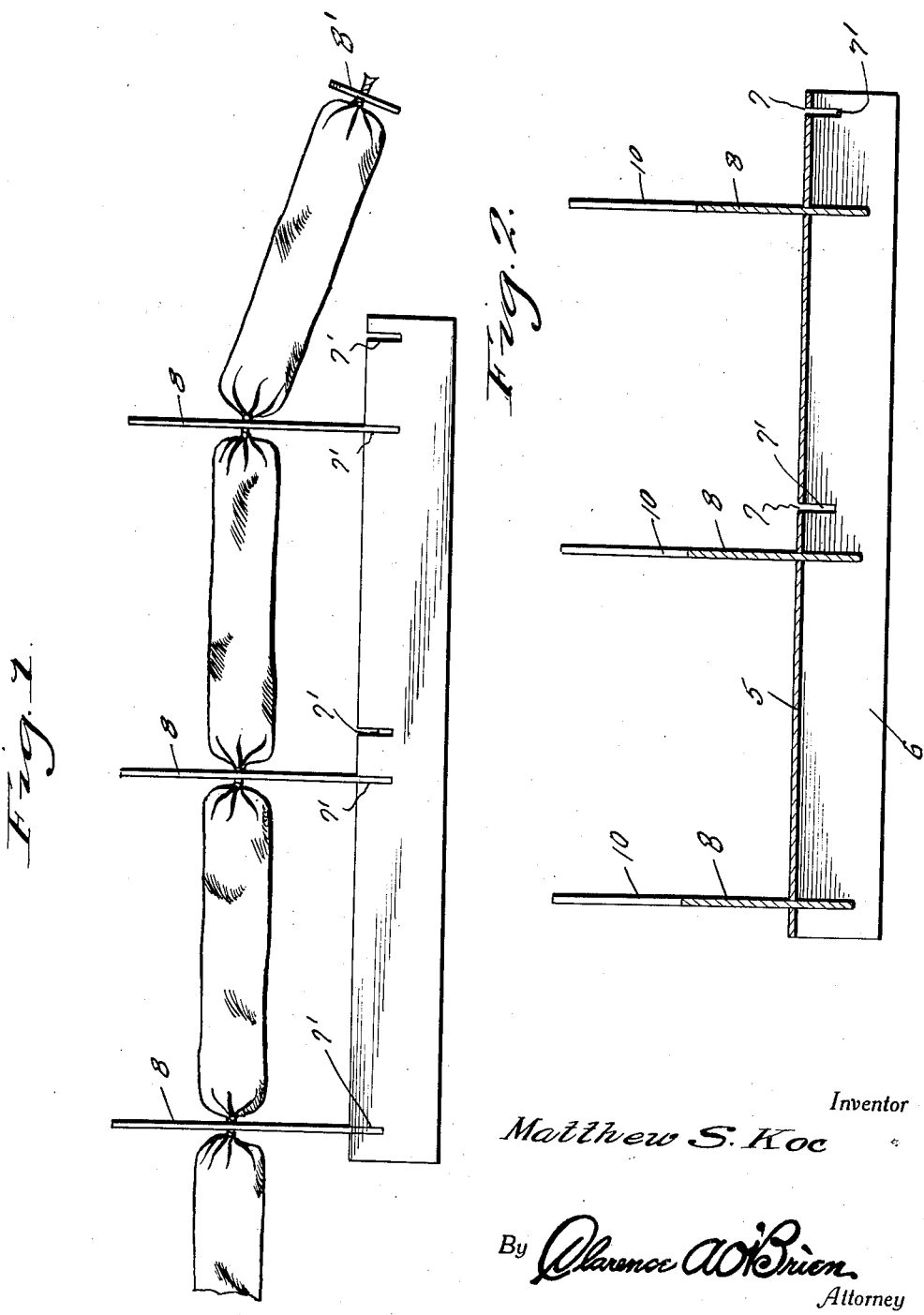

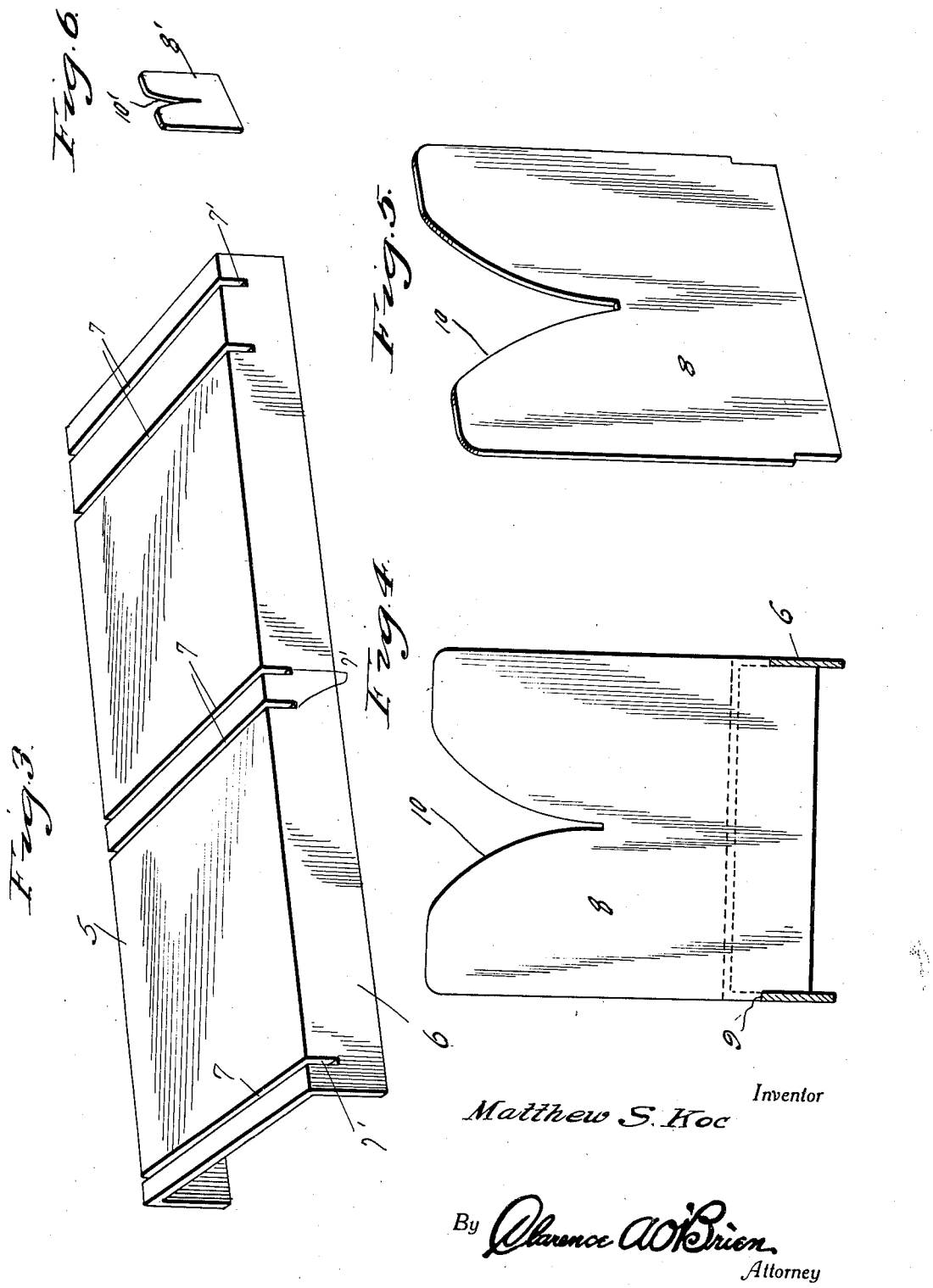

1,926,154

UNITED STATES PATENT OFFICE 1,926,154

APPARATUS FOR PREPARING LINK SAUSAGES

Matthew Stanley Koc, Passaic, N. J.

Application March 16, 1932. Serial No. 599,309

1 Claim. (Cl. 17—34)

The present invention relates particularly to an apparatus for readily enabling stuffed sausage to be formed into links of equal length. It is common practice in linking sausages, for the operator to pinch the filled sausage casing with the thumb and forefinger and thus squeeze back the meat and then to rotate the first link to cause a twisting of the casing at the constricted point. The disadvantage of this method is that the links are un-uniform in size and the prime purpose of the present invention is to provide an apparatus whereby the links may be easily and accurately formed into uniform length.

Another very important object of the invention resides in the provision of an apparatus of this nature which is exceedingly simple in its construction, easily adjusted, sanitary, thoroughly efficient and reliable and otherwise well adapted to the purpose for which it is designed.

With the above and numerous other objects in view as will appear as the description proceeds, the invention resides in certain novel features of construction, and in the combination and arrangemet of parts as will be hereinafter more fully described and claimed.

In the drawings:

Figure 1 is a side elevation of an apparatus embodying the features of my invention.

Figure 2 is a vertical longitudinal section therethrough.

Figure 3 is a perspective view of the base.

Figure 4 is a vertical transverse section through the apparatus.

Figure 5 is a perspective view of one of the plates, and

Figure 6 is a perspective view of a small auxiliary plate.

Referring to the drawings in detail, it will be seen that numeral 5 denotes an oblong base plate having on its longitudinal edges depending flanges 6. The base plate 5 is formed with a plurality of transverse slots 7 having extensions 7' in the upper portions of the flanges 6. Numerals 8 denote substantially rectangular plates the lower ends of which are reduced in width to extend down through the slots 7 so that shoulders 9 rest on the ends of the slot extensions 7'. In the upper edges of the plate 9 are formed V-shaped notches 10, the sides of which are preferably curved. The slots 7, 7' are arranged so that the plates may be disposed at different distances apart depending upon the desired length of the links of the frankfurters or sausage. The operator first twists the end of the casing by utilizing an auxiliary relatively small plate 8' with a notch 10' as is shown to advantage in Figure 6 and then the filled casing is forced down into the notches 10, forming the links of uniform length, and then the links are rotated to provide the desired connecting twist between the links.

It is thought that the construction, utility and advantages of this invention will now be quite apparent to those skilled in this art without a more detailed description thereof.

The preferred embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

An apparatus for preparing link sausages comprising a base with transverse slots, plates to fit in said slots and rise from said base, the upper ends of the plates being formed with notches, said base being formed with depending flanges on the longitudinal edges thereof and the slots extending down part way into the flanges, and said plates having the lower ends thereof reduced in width to extend through the slot and form shoulders to rest on the bottom of the slot extension to prevent lateral movement of the plate with respect to the base.

MATTHEW STANLEY KOC.